United States Patent Office

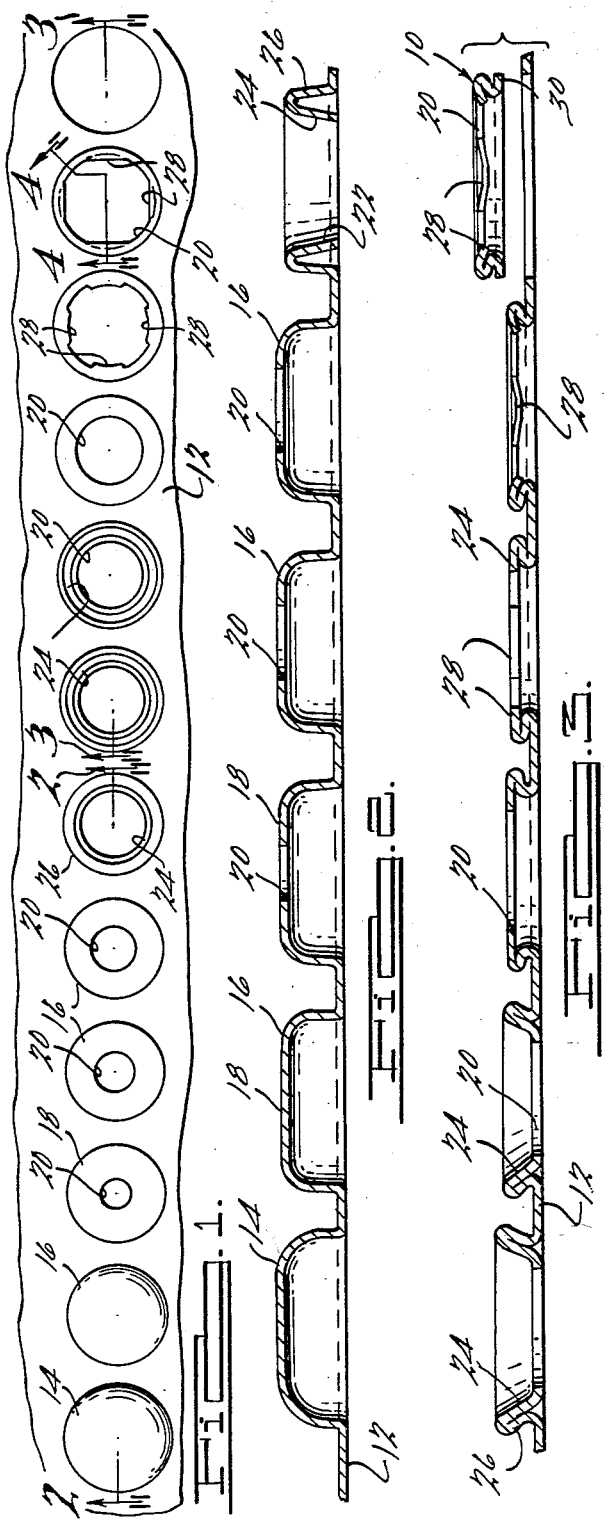

3,143,355
Patented Aug. 4, 1964

3,143,355
SPARK PLUG GASKET
Arthur F. Gobb, Wyandotte, Mich., assignor to McCord Corporation, Detroit, Mich., a corporation of Maine
Filed Aug. 15, 1961, Ser. No. 131,682
2 Claims. (Cl. 277—236)

This invention relates to spark plug gaskets of the type adapted to provide a seal between a spark plug and the cylinder head of an engine, the gasket being disposed on the threaded end of the plug and compressed between the cylinder head and a shoulder on the plug as the plug is threaded into the cylinder head. The invention is more particularly directed to a spark plug gasket which is adapted to be threaded on the threaded end of the spark plug and which is of three-ply construction so that when the spark plug is secured to the cylinder head the gasket will be partially compressed and provide a dependable seal between the plug and the cylinder head.

Gaskets are conventionally employed to provide a seal between the spark plug and the cylinder block of an engine, and such gaskets conventionally are of a size so that they can be readily slipped over the threaded end of the plug. Such gaskets even after being compressed have an internal diameter which permits them to slip off the threaded end of the plug, with the result that it sometimes happens that the gasket slips off the plug before the plug is threaded into the cylinder block. In my prior application Serial No. 807,786, filed April 21, 1959, for "Spark Plug Gasket," now Patent No. 3,029,084, I have disclosed a slip-on type of spark plug gasket which after being partially compressed has projections which cooperate with the threads of the plug so that it cannot slip off the plug but must be threaded off.

The present invention provides a spark plug gasket which is of three-ply construction and which incorporates integral projections which are cooperable with the threads of the spark plug whereby the gasket is adapted to be threaded onto the plug, and once this has been done the gasket cannot accidentally become separated from the plug. In addition, the three-ply construction provides a considerable amount of compressibility and resiliency so as to provide a dependable seal between the shoulder on the plug and the cylinder block.

A principal object of the invention, therefore, is to provide a new and improved spark plug gasket.

Another object of the invention is to provide a new and improved three-ply spark plug gasket of the screw-on, screw-off type.

Another object of the invention is to provide an efficient and economical method of making such spark plug gasket.

Other and further objects of the invention will be apparent from the following description and claims and may be understood by reference to the accompanying drawing which by way of illustration shows a preferred embodiment of the invention and what I now consider to be the best mode of applying the principles thereof. Other embodiments of the invention may be used without departing from the scope of the present invention as set forth in the appended claims.

In the drawings:

FIG. 1 is a plan view of a strip of metal illustrating the sequence of operations performed thereon to produce the gasket of this invention;

FIG. 2 is an enlarged sectional view taken along the line 2—2 of FIG. 1;

FIG. 3 is an enlarged sectional view taken along the line 3—3 of FIG. 1; and

FIG. 4 is an enlarged sectional view of a spark plug gasket taken along the line 4—4 of FIG. 1.

The gasket 10 preferably is made from a strip 12 of suitable sheet metal gasket stock, such as copper or steel. The strip 12 preferably is fed through a reciprocating type of press having a series of dies or punches which are adapted upon the reciprocation of the press to work the metal of the strip 12 so as to form the gasket in accordance with the several steps as illustrated in FIGS. 1 to 3.

In the first step the strip 12 is drawn so as to form the convex-concave boss or cup 14. At the next station of the press the boss 14 is further drawn and somewhat flattened so as to form the boss 16 having a flat surface 18. At the next station a punch forms a central hole 20 in the surface 18. At the next two stations the hole 20 is progressively enlarged as a result of more deeply drawing the embossing 16. At the next station the metal around the hole 20 is folded inwardly as indicated at 22 to form a collar having an inner ply 24 surrounded by an outer ply 26. At the next two stations the plies 24 and 26 are dished so that they overlie the flat portion of the strip 12 while leaving the stock around the enlarged hole 20 in the original plane of the stock 12.

At the next station the plies 24 and 26 are further folded over the flat stock of the strip 12 and the metal around the hole 20 is displaced from the plane of the stock, the hole 20 being further enlarged in this step. At the next station an annulus of metal is removed from the portion 18 so as to further enlarge the hole 20 and leave a series of radially inwardly extending projections 28 which project inwardly from the end ply 24. At the next station the metal of the ply 24 around the opening therein is countersunk which serves to increase somewhat the thickness of the metal at the outer periphery of the ply 24 and thus contributes to the resiliency of the U-shaped bend or fold which integrally joins the ply 24 to the adjacent ply 26. At the next station the formed gasket is cut from the strip 12. It is to be noted that an undistorted part of the strip 12 is left so as to form the third ply 30 of the gasket.

FIG. 4 shows the three-ply gasket as formed with the inwardly extending projections 28. In the finished gasket the I.D. of the opening 20 is greater than the O.D. of the threads of the plug for which the gasket is intended, but the projections 28 extend radially inward sufficiently so that their inner extremities define a circle which is less than the outer diameter of the plug threads whereby the gasket is adapted to be threaded onto a plug instead of being slipped on as is conventional. Thus after the gasket has been threaded on the plug, it cannot accidentally become separated therefrom.

The three-ply construction of the gasket provides a considerable amount of compressibility and resilience for the gasket so that it will provide an effective seal between the plug and the cylinder head when the plug is tightened into the threaded socket in the cylinder head.

While I have illustrated and described a preferred embodiment of my invention, it is understood that this is capable of modification, and I therefore do not wish to be limited to the precise details set forth but desire to avail myself of such changes and alterations as fall within the purview of the following claims.

I claim:

1. A spark plug gasket for assembly with a spark plug having a threaded end and an undercut portion inwardly of said threaded end, said gasket comprising an annular sheet metal member bent back upon itself to define a series of generally parallel deformable ring portions integrally joined at their peripheries, one of said ring portions having connected thereto in fixed radial relation a series of integral radially inwardly extending uniform projections spaced around the inner periphery thereof, the inner extremities of said projections defining a series of thread members disposed in a circle inwardly of said sealing surfaces, said projections being of a size to mate with the threads of the threaded end of said plug whereby said gasket when said projections are mated with the threads of said plug may be screwed on or off the threaded end of said plug, the outermost ring portions providing annular sealing surfaces and said projections being disposed between said sealing surfaces and of an overall thickness substantially less than the overall thickness of the series of said ring portions in their compressed condition so that the fixed relationship of said projections relative to said ring portions and the diameter of the circle formed by the inner extremities thereof are not disturbed by and during compression of said ring portions.

2. A spark plug gasket for assembly with a spark plug having a threaded end and an undercut portion inwardly of said threaded end, said gasket comprising an annular sheet metal member reversely bent to define a series of generally parallel deformable ring portions joined at their peripheries by rounded integral connecting portions, one of said ring portions having connected thereto in fixed radial relation a series of integral radially inwardly extending uniform projections spaced around the inner periphery thereof, the inner extremities of said projections defining a series of thread members disposed in a circle inwardly of said sealing surfaces, said projections being of a size to mate with the threads of the threaded end of said plug whereby said gasket when said projections are mated with the threads of said plug may be screwed on or off the threaded end of said plug, the outermost ring portions providing annular sealing surfaces and said projections being disposed between said sealing surfaces and of an overall thickness substantially less than the overall thickness of the series of said ring portions in their compressed condition so that the fixed relationship of said projections relative to said ring portions and the diameter of the circle formed by the inner extremities thereof are not disturbed by and during compression of said ring portions.

References Cited in the file of this patent

UNITED STATES PATENTS

| | | |
|---|---|---|
| 1,609,283 | Bailey | Dec. 7, 1926 |
| 1,685,059 | Bailey | Sept. 18, 1928 |
| 1,863,893 | Bailey | June 21, 1932 |
| 2,108,512 | Reichenbach | Feb. 15, 1938 |
| 2,941,105 | Rickenbach | June 14, 1960 |
| 3,025,820 | Rosenthal | Mar. 20, 1962 |
| 3,029,084 | Gobb | Apr. 10, 1962 |
| 3,099,456 | Hopp | July 30, 1963 |

FOREIGN PATENTS

| | | |
|---|---|---|
| 414,395 | Italy | July 24, 1946 |
| 1,162,823 | France | Apr. 14, 1958 |